April 27, 1965 H. C. METTLER 3,180,626
ULTRASONIC CLEANER AND METHOD OF GENERATING MECHANICAL VIBRATIONS THERETO
Original Filed Sept. 15, 1960
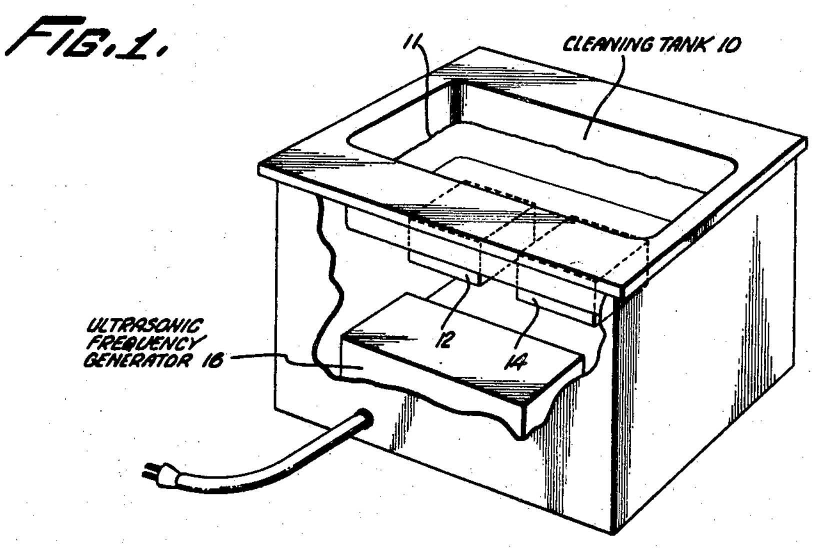
FIG. 1.
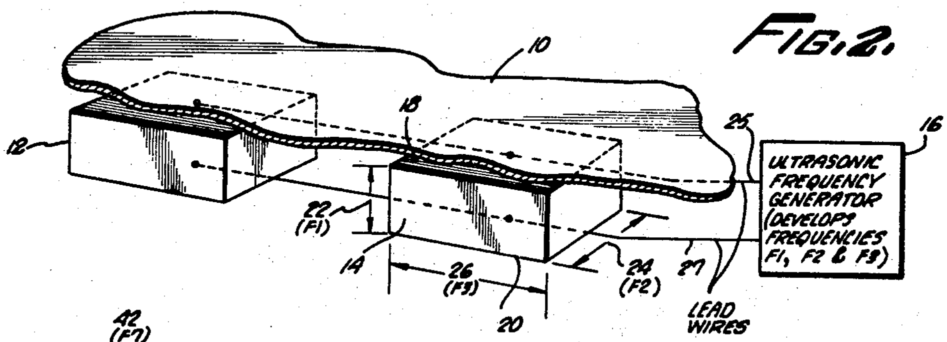
FIG. 2.
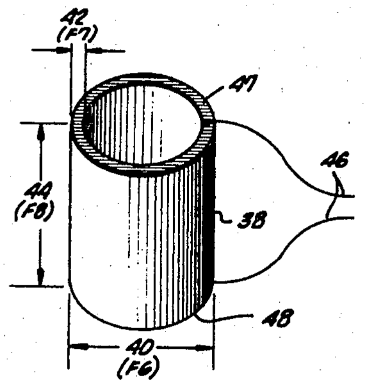
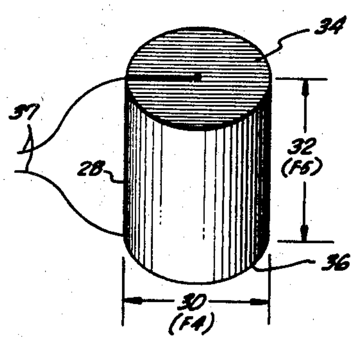
FIG. 4. FIG. 3.
INVENTOR.
HAL C. METTLER
BY
Christie, Parker & Hale
ATTORNEYS 3,180,626

ULTRASONIC CLEANER AND METHOD OF GENERATING MECHANICAL VIBRATIONS THERETO

Hal C. Mettler, 1709 Putney Road, Pasadena, Calif.

Continuation of abandoned application Ser. No. 56,170, Sept. 15, 1960. This application July 5, 1963, Ser. No. 294,223
8 Claims. (Cl. 259—72)

This invention relates to piezoelectricity and more particularly to cleaning apparatus using mechanical vibrations and a method of generating mechanical vibrations thereto.

This case is a continuation of a previously filed patent application, Serial No. 56,170, which was filed September 15, 1960, now abandoned, by the same inventor as this patent application.

Ultrasonic cleaners are well known in the art which utilize sonic energy or mechanical vibratory energy for cleaning foreign particles from objects, such as surgical instruments, clothing, etc. Ultrasonic cleaners generally comprise a cleaning tank for holding a wetting agent and objects to be cleaned. One or more piezoelectric elements or crystals, depending on the amount of energy needed, are attached to the bottom of the cleaning tank and an electrical signal generator is provided for applying a high frequency electrical field across the piezoelectric crystals. In the following discussion piezoelectric crystals will be defined as those crystals, such as rochelle salt crystals and polarized barium titanate crystals, which mechanically vibrate when subjected to a high frequency electrical field. Thus, the high frequency electrical field causes the piezoelectric crystal to mechanically vibrate and, in turn, vibrate one of the surfaces of the cleaning tank. This sets up sonic vibratory energy in the wetting agent and thereby cleans foreign particles from the objects placed in the cleaning tank.

In order to get useful mechanical energy for cleaning, the piezoedectric crystals must be energized at their resonant frequencies. It is known that piezoelectric crystals have a number of resonant frequencies. It is known that these frequencies are inversely proportional to certain dimensions of the crystal. In the past, useful mechanical vibration energy has been obtained from piezoelectric crystals by applying a high frequency electrical field across the crystal parallel to a predetermined dimension. The frequency of the applied electrical field is equal to the resonant frequency of the crystal determined by the predetermined dimension. For example, a rectangular parallelepiped piezoelectric crystal has resonant frequencies proportional to the distance between any two parallel surfaces of the crystal. Thus, with parallelepiped piezoelectric crystals, useful mechanical vibration energy has been obtained in the past by energizing it between two parallel surfaces with a frequency equal to the resonant frequency of the crystal determined by the distance between the same two surfaces.

In ultrasonic cleaners low frequency mechanical vibrations in the order of 25 kilocycles, as opposed to high frequencies as used in sounding devices, are most desirable since large soft foreign particles are better removed at low frequencies than at high frequencies. However, at this frequency a crystal, energized with an electrical field parallel to a dimension corresponding to the frequency of the applied field, must be very large and expensive. Using a barium titanate polarized crystal as an example, a dimension of about four inches is required parallel to the electric field for a resonant frequency of 25 kilocycles whereas a dimension of about one inch is required for a resonant frequency of 90 kilocycles. Since the area of the crystal needed for contact with the cleaning tank remains constant, the size of the crystal needed at 25 kilocycles is about four times the size of the crystal needed at 90 kilocycles. Also, the electric potential required for energizing crystals depends on dimensions of the crystal through which the electrical field is passed. Thus, an electrical potential of about 400 volts is needed on a one-inch crystal whereas a potential of about 1600 volts is required for a four-inch crystal. The cost and size of a high frequency generator for energizing the crystal increases rapidly with increased voltage requirements. Also, the cost of a crystal increases greatly with an increase in its size. As a result, it is highly desirable to employ as small and as thin a piezoelectric crystal as possible.

One prior art method used to obtain a low frequency mechanical vibration with a crystal of relatively small thickness is to stack metallic slugs, of predetermined thickness, on the piezoelectric crystal and then apply an electrical field across the resulting stack. This arrangement is still expensive due to machining needed on the metallic slugs. Also, it still requires a high voltage signal for energizing the piezoelectric crystal since the thickness of the crystal needed is still large.

In both of the above arrangements the resonant frequency, and therefore output energy, of the piezoelectric crystal is critically dependent on loading, giving a narrow frequency versus useful mechanical energy bandwidth. Thus, whenever the weight of the solution and objects being cleaned in the cleaning tank are changed, the loading on the crystal is changed and the frequency of the field for energizing the crystal must be adjusted to the new resonant frequency.

In contrast, the present invention provides a means of energizing piezoelectric crystals at low frequencies and still allows the use of thin crystals. This allows low voltage signals to be used for energizing the crystals. It has also been found that a much broader band of resonant frequencies is obtained whereby loading on the crystal has virtually no effect on its useful mechanical output energy. Also, the vibratory energy has been found to be uniform throughout the cleaning liquid in the cleaning tank.

Briefly, the present invention comprises a cleaning tank and a piezoelectric crystal, for mechanically vibrating the tank. A frequency generator is provided for applying an ultrasonic frequency electrical field through the piezoelectric crystal. However, in contrast to the prior art, the frequency of the electrical field applied is equal to the resonant frequency of the crystal which corresponds to a dimension of the crystal *other* than the dimension of the crystal parallel with the applied electrical field.

A better understanding of the invention may be had with reference to the following detailed description and figures, in which:

FIG. 1 is a perspective view partially broken away of an ultrasonic cleaner embodying the invention;

FIG. 2 is an enlarged perspective view of the crystals connected to a portion of the bottom of the cleaning tank of FIG. 1 and to a variable frequency generator, shown in block diagram;

FIG. 3 is a perspective view of a cylindrical-shaped piezoelectric crystal for use in the ultrasonic cleaner of FIG. 1; and FIG. 4 is a perspective view of a tubular-shaped piezoelectric crystal for use in the ultrasonic cleaner of FIG. 1.

Referring now to FIG. 1, a metallic cleaning tank 10 is shown for holding a wetting agent 11, such as water and/or a liquid cleaning agent, as well as objects which are to be cleaned. Two barium titanate crystals 12 and 14 are attached to the bottom of the cleaning tank 10. An ultrasonic frequency generator 16 provides a high frequency, electrical field across the barium titanate crystals 12 and 14 causing them to mechanically vibrate. The mechanical vibrations of the barium titanate crystals 12 and 14 cause vibrations at the bottom of the cleaning tank 10 providing cleaning action in the liquid 11.

Referring now to FIG. 2, an enlarged view of the barium titanate crystals 12 and 14 are shown connected to a portion of the bottom of the cleaning tank. The barium titanate crystal 14 is a rectangular parallelepiped and has two metallic electrodes 18 and 20 electrically connected to two opposite surfaces thereof for providing an even electrical field through the crystal 14. The metallic electrodes 18 and 20 may be conductors such as silver and may be plated or sprayed on by a conventional process. The metallic electrode 18 is attached to the bottom of the cleaning tank 10. The connection of the metallic electrode 18 and the cleaning tank 10 is by means of a nonhardening cement, or other means which will not deteriorate and allow the connection to be broken under the strain of mechanical vibrations. The barium titanate crystal 14 has three different physical dimensions 22, 24, and 26 arranged in increasing order of magnitude. The dimensions 22, 24, and 26 correspond to three different resonant frequencies of the crystal 14 and are designated F1, F2, and F3 respectively. By way of example, the dimensions 22, 24, and 26 may be one inch, two and one-half inches, and four inches, respectively. The resonant frequencies F1, F2, and F3 then would be approximately equal to 90 kilocycles, 40 kilocycles, and 25 kilocycles, respectively. It should also be understood that dimensions corresponding to frequencies below and above ultrasonic frequencies may also be used without departing from the invention.

The barium titanate crystal 12 is identical to the barium titanate crystal 14. Similar to the barium titanate crystal 14, the barium titanate crystal 12 has metallic electrodes and is attached to the bottom of the cleaning tank 10. Two lead wires 25 and 27 connect the metallic electrodes on the barium titanate crystals 12 and 14 in parallel circuit arrangement to the output circuit of the ultrasonic frequency generator 16.

The ultarsonic frequency generator 16 may be a conventional type of oscillator circuit employing a tetrode or pentode tube connected across a tuned tank circuit for providing an alternating current output signal. It should be understood that three different tank circuits could be used tuned to the three frequencies F1, F2, and F3 and be arranged to be selectively switched across the tube and thereby to provide the three different output frequencies F1, F2, and F3.

Since the barium titanate crystals 12 and 14 are identical, the following description of the operation thereof is directed to the crystal 14 only. However, it should be understood that one or any other number of crystals may be used depending on the mechanical vibratory energy to be supplied to the cleaning tank 10.

When the output signal of the ultrasonic frequency generator 16 has a frequency corresponding to the dimension 22, a frequency designated F1, the crystal structure of the barium titanate crystal 14 vibrates parallel to the direction of the dimension 22. Since the crystal deforms, there are mechanical deformations, hence vibrations, in the barium titanate crystal 14 in all directions. Thus, it is seen that the crystal 14 may also be attached to the bottom of the cleaning tank 10 at one of its other surfaces other than that attached to the metallic contact 18.

Similarly, when the ultrasonic frequency generator 16 develops an output signal having a frequency corresponding to the dimension 24, a frequency of F2, the crystal structure vibrates in a direction parallel to the dimension 24. Again, this causes mechanical vibrations of the crystal 14 in all directions. Also when the ultrasonic frequency generator 16 develops an output signal having a frequency corresponding to dimension 26, a frequency designated F3, mechanical vibrations are developed in all directions in the crystal 14.

In summary, except for the frequency designated F1, corresponding to the dimension 22, the rectangular crystal 14 of FIG. 2 vibrates at a resonant frequency determined by a dimension other than the dimension of the crystal in the direction of the applied electrical field. It should also be understood that the ultrasonic frequency generator 16 could be arranged to apply an electrical field across the crystals having all three frequencies at once, or three separate electrical fields having three different frequencies could be applied between different parallel surfaces of the crystals at once. Either of these arrangements would allow the crystals to resonate at all three frequencies at once.

Among the advantages obtained by an embodiment of the present invention in an ultrasonic cleaner are greatly reduced sensitivity of the resonant frequency of the crystal and tank to variations in load in the cleaning tank and uniform cleaning action throughout the entire liquid in the cleaning tank.

It is believed that the decreased sensitivity to variations in load is obtained in part right in the crystal itself because of an electromechanical advantage obtained due to the fact that the crystal is being energized across a small dimension of the crystal while vibrating the crystal at a resonant frequency determined by a larger dimension of the crystal. It is also believed that loading has little effect on the resonant frequency of the crystal because of the way in which the vibratory energy is coupled to the cleaning liquid, the tank and objects in the tank which are to be cleaned. Peaks of vibratory energy are greatest in a crystal parallel with the dimension which determines the resonant frequency at which the crystal is resonating. In the disclosed embodiment of this invention, this peak energy is coupled to the tank parallel with the bottom of the tank causing it to expand and contract with the crystal. Also, the thickness of the bottom of the tank gets larger and smaller with the expansion and contraction of the bottom of the tank. This expansion and contraction of the bottom of the tank in turn causes the walls of the tank to move in and out and set up waves of vibratory energy in the cleaning liquid in the cleaning tank. As a result, both the sides of the tank and the bottom of the tank couple vibratory energy to the cleaning liquid and objects to be cleaned. This causes a preload on the crystal which is much greater than normal load changes due to the objects placed in the tank for cleaning. The overall effect is that the resonant frequency of the crystal is virtually insensitive to load changes.

The aforementioned prior art in ultrasonic cleaners which utilizes a piezoelectric crystal are generally energized so that they vibrate at a resonant frequency determined by a dimension perpendicular to the bottom of the cleaning tank. As a result, the crystal applies peak power perpendicular to the bottom of the cleaning tank thereby causing the vibratory energy to be concentrated in a vertical direction in the cleaning liquid directly above the crystal. Therefore, the vibratory energy in such prior art devices is not uniform throughout the cleaning tank unless a sufficiently large number of crystals are attached to the bottom of the tank to provide uniform vibrations throughout the cleaning liquid.

In contrast, cleaning action is uniform throughout the cleaning tank in an ultrosonic cleaner embodying the present invention. When a piezoelectric cyrstal is attached to the cleaning tank with the dimension which determines the resonant frequency thereof parallel with the bottom of the cleaning tank, the expansion and contraction of the bottom of the tank and the movement of the walls of the tank, as described hereinabove, are believed to cause uniformly distributed vibratory waves throughout the entire liquid in the cleaning tank. The uniform action is obtained with a single crystal in contrast to the prior art which requires a multiplicity of crystals to obtain the same action.

Referring now to FIG. 3, a cylindrical crystal 28 is shown for use in the ultrasonic cleaner of FIG. 1. As illustrated in FIG. 3, there are two crystal dimensions and, correspondingly, two resonant frequencies of the crystal. The dimensions are the diameter 30, which corresponds to a resonant frequency F4, and the length 32, which corresponds to a resonant frequency of F5.

Metallic electrodes 34 and 36 cover the surfaces at the ends of the cylindrical crystal 28 and lead wires 37 are attached to the metallic contacts 34 and 36 for applying an electrical field across the cylindrical crystal 28. Hence, the cylindrical crystal 28 may be attached at one of its ends or at a side to the bottom of the cleaning tank 10. Thus, it is seen that an electrical field having a frequency F4, corresponding to the diameter 30, may be applied across the length of the cylindrical crystal 28 and cause the crystal vibrate and provide useful mechanical energy for cleaning action. It should also be understood that the electrical signal may be applied on the sides of the cylinder at diametrically opposite points on the cylinder wall. With this arrangement the signal may have a frequency F5, corresponding to the length dimension 32 of the cylinder.

Referring now to FIG. 4, a tabular crystal 38 is shown which may be used for applying sonic energy to the cleaning tank 10 of FIG. 1. The tubular crystal 38 has three dimensions, and, correspondingly, three resonant frequencies. The dimensions are the outside diameter dimension 40 which corresponds to a resonant frequency F6, the thickness dimension 42 of the wall of the tubular crystal 38 which corresponds to a resonant frequency F7, and the length dimension 44 which corresponds to a resonant frequency F8. Metallic electrodes 47 and 48 are attached at the ends of the tubular crystal 38, and lead wires 46 are attached thereto for applying an electrical field across the length of the tubular crystal 38.

Thus, an electric field may be applied through the length of the tubular crystal 38 and resonate it at any of the frequencies F6, F7 and F8.

What is claimed is:

1. A method of generating mechanical vibratory energy with a piezoelectric element having a first dimension determinative of a first low resonant frequency of the element and a second smaller dimension determinative of a second higher resonant frequency of the element including the steps of:
   (*a*) generating an electrical signal having a substantially constant and normal operating frequency substantially equal to said low resonant frequency, and
   (*b*) connecting the generated signal across the piezoelectric element in a direction parallel to the smaller dimension to excite said element at the low resonant frequency and allow a low voltage signal to be used for excitation of said element.

2. A method for generating mechanical vibratory energy in a piezoelectric crystal element having a plurality of dimensions each of which is determinative of a discrete resonant frequency of the crystal including the steps of:
   (*a*) generating an electrical signal having a substantially constant and normal operating frequency equal to one of said resonant frequencies, and
   (*b*) coupling the electrical signal across a dimension of the crystal other than the one determinative of the resonant frequency equal to the generated frequency.

3. A method of generating mechanical vibratory energy in a cleaning tank having a piezoelectric element attached to the bottom of the tank, the piezoelectric element having a first dimension determinative of a first low resonant frequency of the piezoelectric element and a pair of parallel surfaces separated by a second smaller dimension determinative of a second higher resonant frequency of the piezoelectric element, including the steps of:
   (*a*) generating an electrical signal having a substantially constant and normal operating frequency substantially equal to said low resonant frequency, and
   (*b*) connecting the generating signal across the pair of parallel surfaces of the piezoelectric element and parallel to the smaller dimension to excite said piezoelectric element in a direction parallel to the smaller dimension at the low resonant frequency and thereby allow a low voltage signal to be used for excitation of said element.

4. In an ultrasonic generator for applying mechanical vibratory energy to an object, the combination which comprises:
   (*a*) a piezoelectric element having a pair of parallel surfaces separated by a first small dimension which is determinative of a first high resonant mechanical vibratory frequency of the element, the element being constructed having a second larger dimension substantially perpendicular to the small dimension which is determinative of a second and substantially lower resonant mechanical vibratory frequency of the element, and
   (*b*) means for applying an alternating current electric signal across said parallel surfaces of the element and across said small dimension and thereby allow a lower voltage signal to be used for excitation of said element, the signal having a substantially constant and normal operating frequency substantially equal to said lower resonant mechanical vibratory frequency of the element.

5. In an ultrasonic generator for applying mechanical vibratory energy to an object, the combination which comprises:
   (*a*) a piezoelectric element having a pair of parallel surfaces separated by a first small dimension which is determinative of a first high resonant mechanical vibratory frequency of the element, the element being constructed having a second larger dimension substantially perpendicular to the small dimension which is determinative of a second and substantially lower resonant mechanical vibratory frequency of the element,
   (*b*) means for applying an alternating current electric signal across said parallel surfaces of the element and across said small dimension and thereby allow a lower voltage signal to be used for excitation of said element, the signal having a substantially constant and normal operating frequency substantially equal to said lower resonant mechanical vibratory frequency of the element, and
   (*c*) means for coupling one of said pair of surfaces of said element to an object.

6. An ultrasonic generator for applying mechanical vibratory energy to an object, the combination of which comprises:
   (*a*) a parallelepiped piezoelectric element having a pair of parallel surfaces separated by a small dimension which is determinative of a first high resonant mechanical vibratory frequency of the element, the element being constructed having a second pair of surfaces separated by a second larger dimension which is determinative of a second and substantially lower resonant mechanical vibratory frequency of the element,
   (*b*) means for applying an alternating current electric signal across said parallel surfaces of the element and across said small dimension and thereby allow a lower voltage signal to be used for excitation of said element, the signal having a substantially constant and normal operating frequency substantially equal to said lower resonant mechanical vibratory frequency of the element, and
   (*c*) means for coupling one of said pair of surfaces of said element to an object.

7. An ultrasonic cleaning unit, the combination of which comprises:
   (*a*) a piezoelectric element having a pair of parallel surfaces separated by a first small dimension which is determinative of a first high resonant mechanical vibratory frequency of the element, the element being constructed having a second larger dimension substantially perpendicular to the small dimension which is determinative of a second and substantially lower resonant mechanical vibratory frequency of the element, (*b*) a member for providing mechanical vibratory energy to objects to be cleaned, including a substantially flat mounting surface for the piezoelectric element, said piezoelectric element being mounted to said mounting surface such that one of said parallel surfaces and said larger dimension are positioned substantially parallel to the mounting surface, and (*c*) means for coupling one of said pair of surfaces of said element to an object.

8. An ultrasonic cleaning unit, the combination of which comprises:

(*a*) a parallelepiped piezoelectric element having a pair of metallic covered parallel surfaces separated by a small dimension which is determinative of a first high resonant mechanical vibratory frequency of the element, the element being constructed having a second pair of surfaces separated by a second larger dimension which is determinative of a second and substantially lower resonant mechanical vibratory frequency of the element, (*b*) a cleaning tank for holding cleaning liquid and objects to be cleaned and including a substantially flat bottom and a side, said piezoelectric element being mounted to said tank with one of said metallic covered surfaces mechanically connected to said tank bottom and parallel therewith, and (*c*) means for applying an alternating current electric signal across said parallel surfaces of the element and across said small dimension and thereby allow a lower voltage signal to be used for excitation of said element, the signal having a substantially constant and normal operating frequency substantially equal to said lower resonant mechanical vibratory frequency of the element.

References Cited by the Examiner

UNITED STATES PATENTS

| | | | |
|---|---|---|---|
| Re. 17,357 | 7/29 | Cady | 310—8.1 |
| 1,724,232 | 8/29 | Taylor et al. | 310—9.5 |
| 1,734,975 | 11/29 | Loomis et al. | |
| 2,257,997 | 10/41 | Barnes. | |
| 2,292,388 | 8/42 | Mason | 310—9.5 |
| 2,495,295 | 1/50 | Spanier | 68—20 |
| 2,574,257 | 11/51 | Franklin | 310—9.5 X |
| 2,640,165 | 5/53 | Howatt | 310—8.1 |
| 2,855,526 | 10/58 | Jones. | |
| 2,891,176 | 6/59 | Branson. | |
| 2,937,292 | 5/60 | Welkowitz et al. | |

CHARLES A. WILLMUTH, *Primary Examiner.*